PACKARD & MEEKINS.
Vegetable Cutter.
No. 45,171.            Patented Nov. 22, 1864.
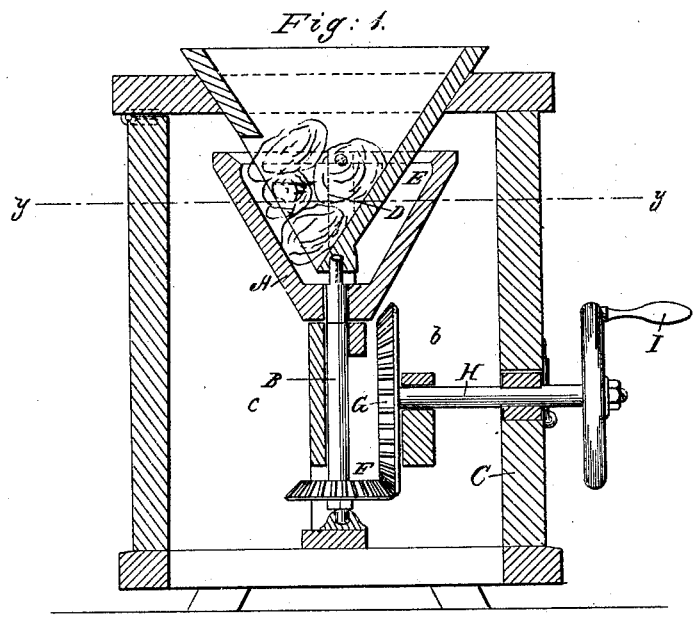
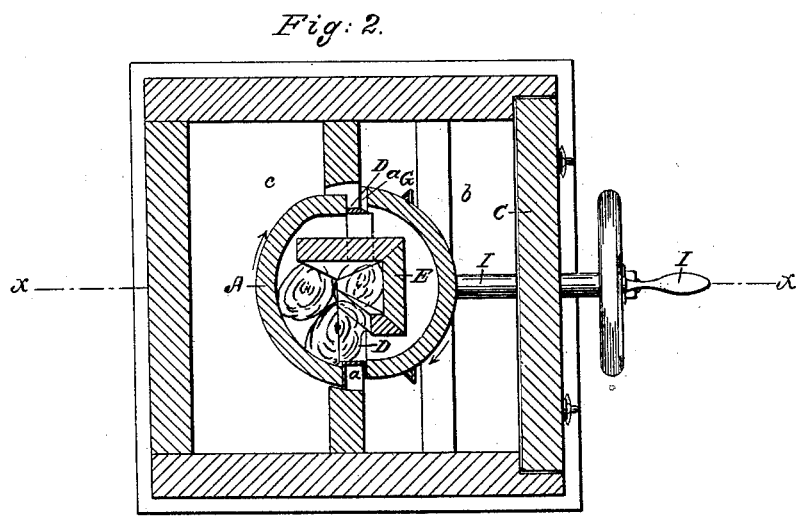

UNITED STATES PATENT OFFICE.

SAMUEL W. PACKARD AND CHARLES A. MEEKINS, OF BUCKLAND, MASS.

IMPROVED VEGETABLE-CUTTER.

Specification forming part of Letters Patent No. 45,171, dated November 22, 1864.

*To all whom it may concern:*

Be it known that we, SAMUEL W. PACKARD and CHARLES A. MEEKINS, both of Buckland, in the county of Franklin and State of Massachusetts, have invented a new and Improved Vegetable-Cutter; and we do hereby declare that the following is a full, clear, and exact description of the same, reference being had to the accompanying drawings, forming a part of this specification, in which—

Figure 1 is a vertical central section of our invention, taken in the plane indicated by the line *x x*, Fig. 2. Fig. 2 is a horizontal section of the same, the line *y y*, Fig. 1, indicating the plane of section.

Similar letters in both views refer to corresponding parts.

This invention consists in the arrangement of a hollow conical rotary cutter-head with a series of knives, in combination with a hopper which extends down into said cutter-head, and which has two of its sides partially cut away, so that the vegetables which may be placed into said hopper are exposed at the proper spot to the action of the knives.

To enable those skilled in the art to make and use our invention, we will proceed to describe its construction and operation with respect to the drawings.

The cutter-head A is secured to the vertical arbor B, which has its bearings in the interior of the case or box C. The cutter-head is made of cast-iron, or of any other suitable material, in the form of a hollow cone, as clearly shown in Fig. 1 of the drawings. It is provided with two or more knives, D, which are secured to its inner surface opposite to slots *a* in its sides, and the inner surface of said conical cutter-head is so shaped that the cutting-edges of the knives project sufficiently beyond the opposite edges of the slots *a* to allow the same to act on the vegetables.

The vegetables are fed to the knives through the hopper E, which is secured on the top of the box C, and which extends down into the conical cutter-head A nearly to its bottom, as clearly shown in Fig. 1. Two sides of the hopper are partially cut away, so that the vegetables which may be placed into the same are exposed to the action of the knives.

The arbor B, together with the cutter-head A, receives a rotary motion by means of a bevel-wheel, F, which is secured to the lower end of said arbor, and which gears into another bevel-wheel, G, that is attached to a horizontal shaft, H. This shaft is operated by a crank, I.

The vegetables, after having been cut, drop down into the lower part of the box C, which is divided into two compartments, *b c*, the compartment *b* to contain the gearing and the compartment *c* to receive the cut vegetables. The open sides of the hopper are so placed that the knives begin to act on the vegetables just after they have passed the partition in the box on one side, and that they cease to act long before they reach said partition on the other side, so that the vegetables, after being cut, are compelled to drop down into the compartment *c*, and that no portion of the same is allowed to get between the gearing.

The principal advantage of our device is obtained by the conical shape of the cutter-head, whereby vegetables of any size can be cut up with little expenditure of power, since the knives act on a short lever, whereas if the knives are attached to a plain disk it requires considerable power to force them through the vegetables.

Our device is very simple in its construction, it is cheap and easily operated, and all its parts are so constructed that they do not easily get out of order.

Having thus fully described our invention, what we claim as new, and desire to secure by Letters Patent, is—

The arrangement of the rotary conical cutter-head A, with a series of knives, D, in combination with the hopper E, constructed and operating as and for the purpose set forth.

SAMUEL W. PACKARD.
CHARLES A. MEEKINS.

Witnesses:
DANIEL FORBES,
FREDERICK FORBES.